Patented Nov. 22, 1949

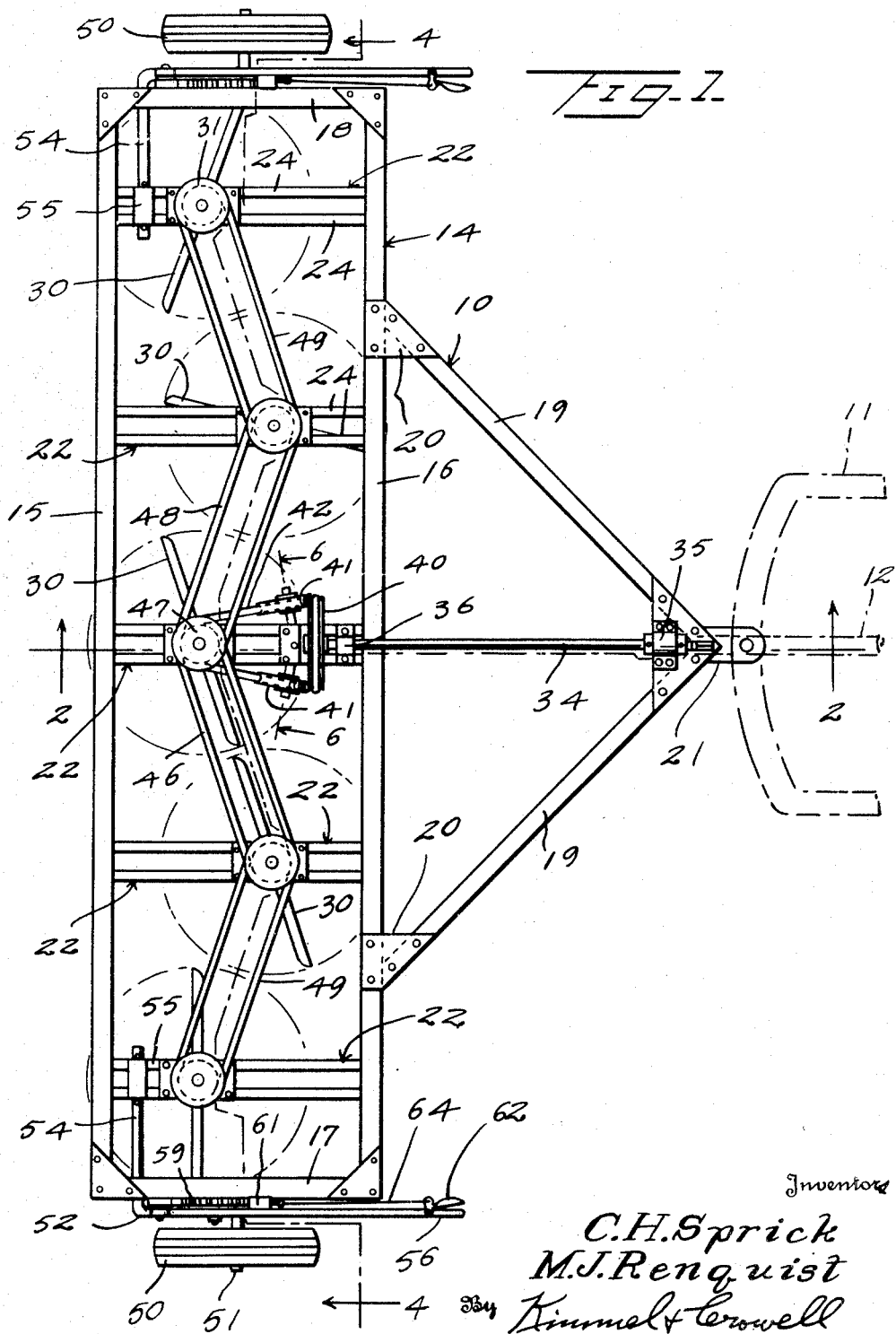

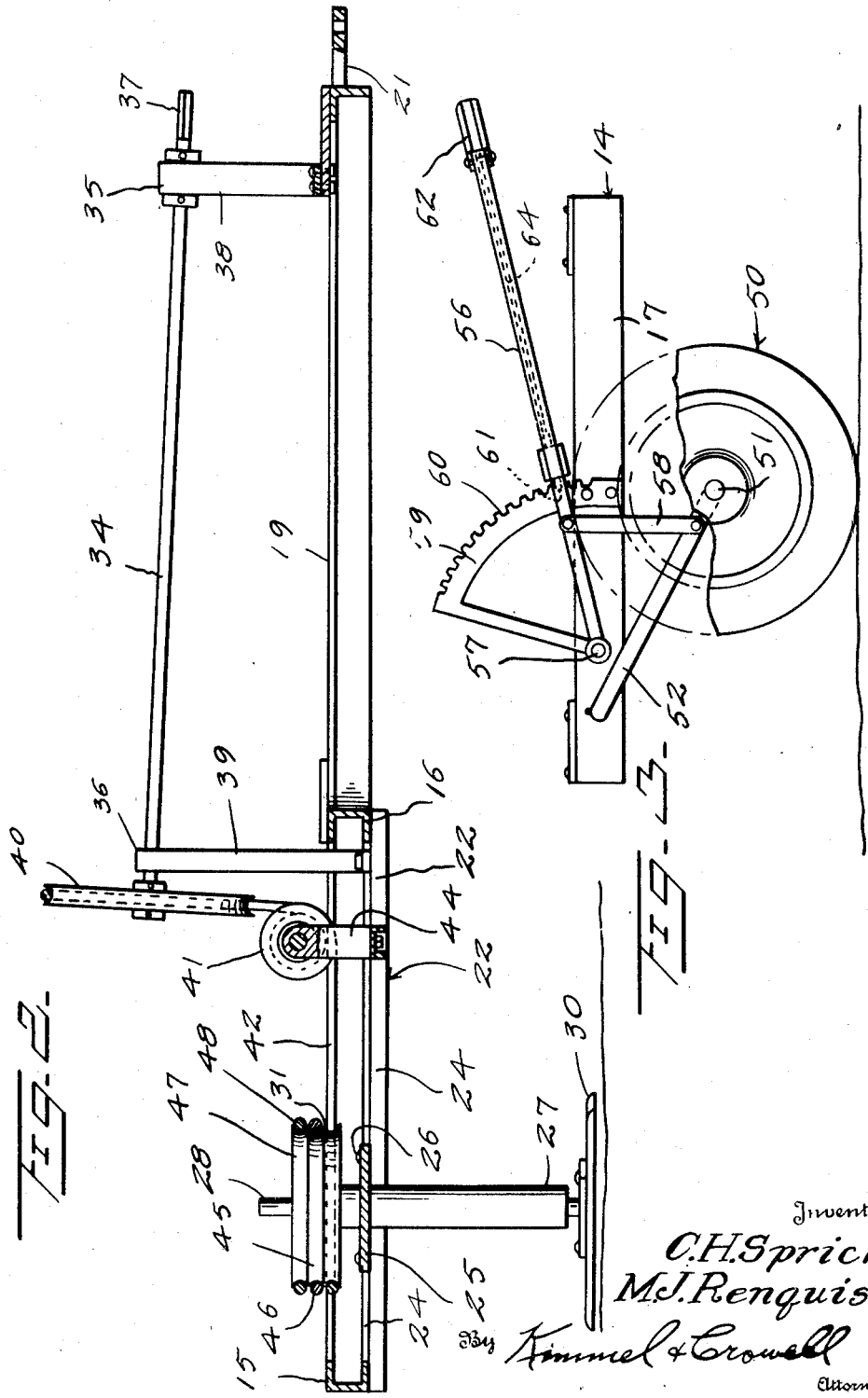

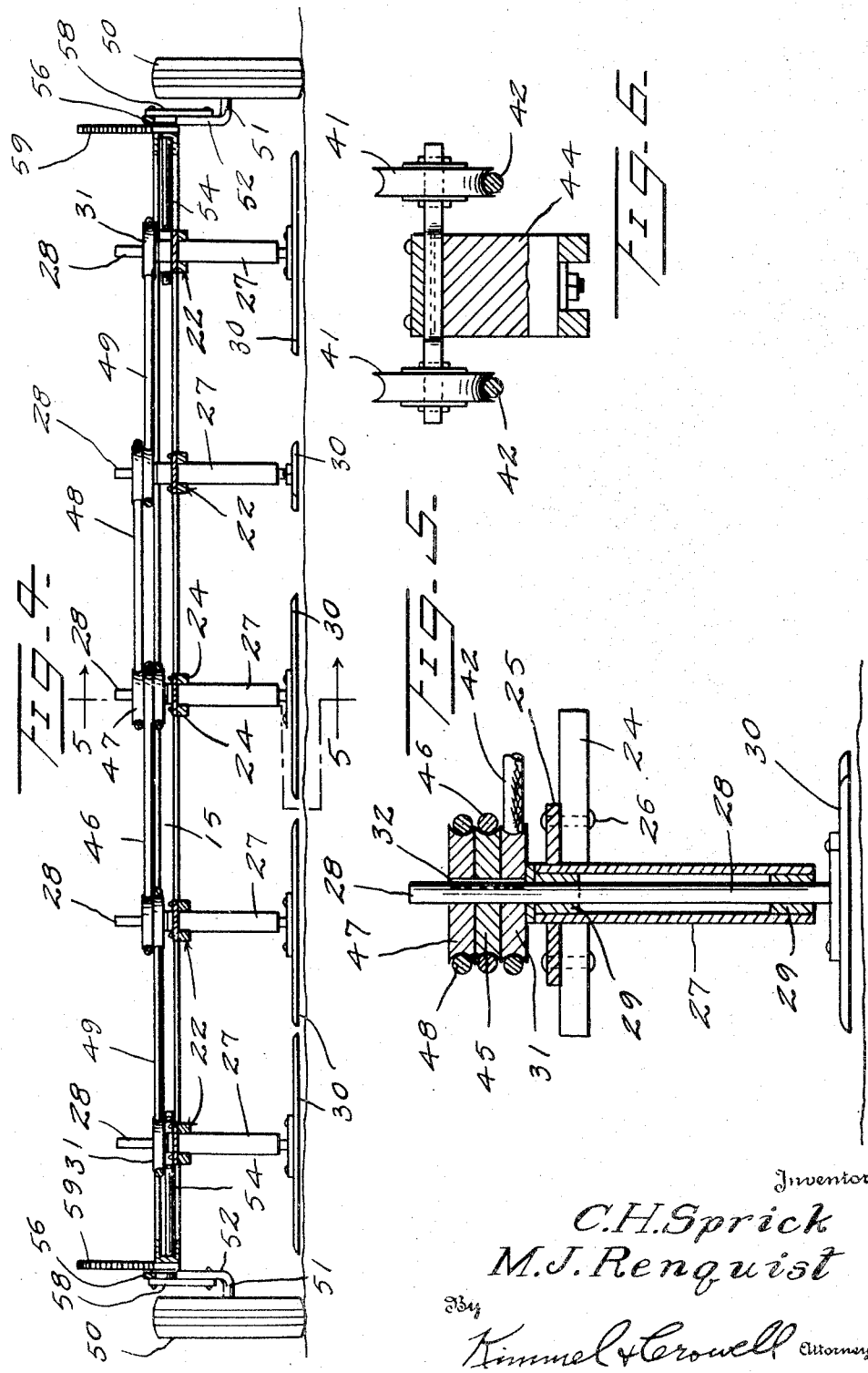

2,489,204

UNITED STATES PATENT OFFICE 2,489,204

STUBBLE CUTTER

Carl H. Sprick and Mervin J. Renquist,
Julesburg, Colo.

Application April 23, 1947, Serial No. 743,306

2 Claims. (Cl. 56—25.4)

This invention relates to improvements in cutters for cutting the straw left standing after combines have been used to clip the heads off the wheat.

In certain dry farm lands, it has been found to be advantageous to the soil to leave straw and other rubbish on top of the ground in preference to plowing it under. The ground is in such condition that when the crops have been removed the soil will be very sandy. Winds blow the sand away and rains seem to flow off rather than to penetrate the earth. It has been found that by leaving the straw on top of the ground, the sandy earth is held from blowing around, and the rain water is checked and held from running off, thus penetrating and aiding the soil. However, by leaving the straw standing after the combine has been through, it is very difficult to move other tools and machinery in to cut the straw, without interfering with the operation of these tools, as by clogging their working parts.

It is an object of our invention to provide an improved cutting machine or stubble cutter which may be drawn through a field by a tractor or other suitable machine, which cutter will rapidly and efficiently cut the straw as close to the ground as the terrain will permit.

Another object of this invention is to provide an improved stubble cutter of the kind to be more specifically described hereinafter, which is constructed with high speed rotary cutting blades driven from the power take-off connection of the tractor.

Still another object of this invention is to provide a stubble cutter of this kind, having a plurality of laterally disposed cutting blades which are longitudinally off-set, whereby the cutting blades of one cutting member will substantially overlap the blades of the adjacent cutting member, whereby a full, clear path may be cut by this cutting machine.

Yet another object of this invention is to provide an improved cutting machine of this kind having a frame from which the cutting members depend, and an axle pivotally mounted on the frame for adjusting the height of the frame and cutting members in relation to the terrain on which the machine is being used.

With the above and other objects in view, our invention consists in the arrangement, combination and details of construction disclosed in the drawings and specification, and then more particularly pointed out in the appended claims.

In the drawings,

Figure 1 is a top plan view of a stubble cutting machine constructed according to an embodiment of this invention, Figure 2 is a longitudinal section taken on the line 2—2 of Figure 1, Figure 3 is an end elevation, partly broken away, Figure 4 is a horizontal section taken on the line 4—4 of Figure 1, Figure 5 is a vertical section taken on the line 5—5 of Figure 4, Figure 6 is a fragmentary detail section taken on the line 6—6 of Figure 1.

Referring to the drawings, the numeral 10 designates generally a stubble cutter having rotating blades for cutting the straw left standing in a wheat field or the like, after the combines and other harvesting machines have completed their work.

The stubble cutter 10 is adapted to be secured to the rear end of a tractor or other suitable motor power by a drawbar 11, and is adapted to be powered by a shaft, as 12, connected to the power take-off of the tractor. The machine 10 is formed with a substantially rectangular frame 14, having transversely extending side frame members 15 and 16, connected together at their ends by longitudinally extending frame members 17 and 18. Forwardly extending supporting bars 19 are fixed to the front transverse frame member 16 by rivets and connecting plates 20, the supporting bars 19 being connected together at the front end thereof.

A connecting link 21 is adapted to secure the front end of the stubble cutter 10 to the drawbar 11 of the tractor. Transversely spaced apart supporting members 22 are fixed on the frame 14 between the front and rear frame members 15 and 16, at intervals along the length of the transverse members. The supporting members 22 are provided for supporting the cutting blades and their operating means on the frame 10.

The supporting members 22 comprise a pair of spaced apart bars 24, providing a track therebetween. A plate as 25 is adapted to be fixed to the supporting member 22 by rivets 26 or other suitable fastening devices, which engage through the plates 25 and the bars 24. The plates 25 may be fixed on the supporting members 22 at selected positions along the length thereof.

A tube or bearing 27 is fixed to the plate 25 and extends through the plate and downwardly below the supporting members 22 and the frame 14. A shaft 28 is rotatably supported in the bearing 27, by bushings 29 at each end of the bearing. Cutting blades 30 are fixed to the lower end of the shaft 28 and are rotated upon rotation of the shaft.

A pulley 31 is fixed to the upper end of the shaft 28, adjacent the upper end of the bearing 27, for rotating the shaft 28 and the blade 30. The pulley 31 is fixed on the shaft 28 by means of a key 32, or other suitable fastening devices.

A plurality of cutting blades 30 are adapted to be supported on the frame 14 and on the supporting members 22, spaced apart across the width of the frame. Any number of cutting blades 30 may be provided, and one of the blades is directly driven from the power take-off of the tractor, the other blades being inter-connected with the first blade and the power take-off. Adjacent blades are longitudinally offset, one from the other, so that the adjacent blades may overlap each other transversely of the frame. In this manner as the cutter is moved through the field, a complete path is cut by the adjacent blades.

In the drawings, the center cutting member is driven from the power take-off of the tractor, and the outboard cutting members are driven by connection with the driving means of the center cutting member.

A drive shaft 34 is rotatably supported by a bearing 35, fixed to the front end of the drawbar formed by the bars 19, and at its rear end by a bearing 36 carried by the frame 14. The front end 37 of the drive shaft 34 is provided for connection to the drive shaft 12 of the power take-off of the tractor.

The bearings 35 and 36 are supported above the frame 14 by supporting arms 38 and 39 respectively. A main driving pulley 40 is fixed to the rear end of the drive shaft 34 for rotation thereby. The pulley 40 is disposed in a vertical plane, parallel to the length of the frame 14, and at right angles to the drive shaft 34.

A pair of pulleys 41 are carried by the frame 14 at the center thereof, in a vertical plane, at right angles to the plane of the pulley 40, and are disposed in such a manner that a flexible driving member 42 may be trained below one pulley 41, over the pulley 40, and under the other pulley 41 on the opposite side of the pulley 40, from the first pulley 41. In this manner the motion of the flexible cable 42 is changed from a vertical plane to a horizontal plane. The cable 42 is then trained about the pulley 31 fixed on the upper end of the shaft 28 of the center cutting member. The pulleys 41 are supported on the frame 14 by brackets 44 fixed to the center supporting member 22.

For driving the outer cutting members on one side of the frame, a second pulley as 45, is fixed on the shaft 28 of the center cutting member, and a flexible driving member 46 is trained about the pulley 45 and the pulley 31 of the adjacent cutting member. A third pulley 47 is fixed on the center shaft 28 for driving the cutting member on the opposite side.

A cable 48 is trained about the upper pulley 47 and about the pulley 31 of the adjacent cutting member, on the opposite side from that described above. Further cutting members, disposed outwardly of the outer members above described, are rotated by connections with the adjacent outermost cutter. The outermost cutting members are driven by a flexible member, as 49, which engages about the pulley 31 on the outermost shaft 28, and a second pulley on the adjacent cutting member.

The cutting blades 30 are disposed close to the ground for cutting the stubble as close as possible, and the blades 30 may be adjusted relative to the ground by moving the frame 14 relative to the axles of the supporting wheels 50. The wheels 50 are supported on the opposite ends of the frame 14 parallel to the side frame members 17 and 18. The wheels 50 are rotatably mounted on the axle 51, and the axle is fixed on an arm 52 pivotally carried by the outer frame members 17 and 18.

The upper end of the arm 52, opposite from the axle 51, is bent or formed parallel to the axle 51, longitudinally offset therefrom. The shaft 54, formed by bending the upper end of the rod 52, provides a pivot for the axle support member. The shaft 54 is rotatably carried by bearings 55 fixed on the frame members 22, and the frame 14.

An operating lever 56 is pivotally carried on the outer frame members 17 and 18 by a pin 57 forwardly of the shaft 54. A link 58 is loosely connected to the lever 56 intermediate the length of the lever, and pivotally connected to the arm 52 adjacent the axle 51. Pivotal movement of the lever 56 will then effect vertical movement of the wheel 50 relative to the frame 14.

A quadrant, as 59, is fixed on the frame 14 at each end thereof, and is provided with a toothed outer edge 60 in which a dog 61 carried by the lever 56 is adapted to engage for locking the lever in selected pivoted position. The locking dog 61 is spring-pressed to locking position and may be moved to released position by a handle 62 carried on the outer end of the lever 56. The handle 62 is connected to the dog 61 by a connecting link or member 64.

In the use and operation of this stubble cutter 10, a shaft 34 is fixed by a suitable connection to the drive shaft 12 of the tractor. Rotation of the shafts 12 and 34 will rotate the pulley 40. The flexible member 42, trained about the pulley 40, will then in turn rotate the pulleys 31, 45 and 47 for rotating the adjacent shafts 28. The distance of the cutting blades 30 from the ground may be varied selectively by adjusting the operating lever 56 to the desired vertical position, whereupon the wheels 50 will be raised or lowered relative to the frame 14 from which the blades 30 depend.

We do not mean to confine ourselves to the exact details of construction herein disclosed, but claim all variations falling within the purview of the appended claims.

What we claim is:

1. A stubble cutter comprising a mobile frame, means for vertically adjusting said frame, a V-shaped drawbar fixed to and extending forwardly of said frame adapted to be connected to a tractor vehicle, a plurality of vertically disposed horizontally spaced apart cutter shafts, cutters carried by the lower ends of said cutter shafts, bearings for said shafts fixed to said frame, a drive shaft extending longitudinally of said drawbar and disposed above the latter adapted for connection to the power take-off of a tractor, bearings for said drive shaft carried partly by said frame and partly by the apex of said drawbar adjacent the forward end of the latter, and an operative connection between said drive shaft and said cutter shafts.

2. A stubble cutter comprising a mobile frame, a vertically disposed cutter shaft journalled in the center of said frame, a pair of vertically disposed horizontally spaced apart cutter shafts journalled in said frame on each side of said center shaft, a triple grooved pulley fixed on said center shaft, a double grooved pulley fixed on the innermost of each of said pairs of cutter shafts, a single grooved pulley fixed on the outermost of each of said pairs of cutter shafts, a flexible belt member trained about each of said single grooved pulleys and each of said double grooved pulleys, a flexible belt member trained about each of said double grooved pulleys and said triple grooved pulley, a draw bar extending forwardly from said frame, a drive shaft having the opposite ends journalled on said frame and said draw bar, a pulley wheel fixed on the rear end of said drive shaft, a transverse stub shaft journalled on said frame below said pulley wheel, an idler pulley rotatably mounted on each end of said stub shaft, a flexible driving member trained about said pulley wheel, said triple pulley, and said idler pulleys, and cutter blades secured to the bottom ends of each of said cutter shafts.

CARL H. SPRICK.
MERVIN J. RENQUIST.

REFERENCES CITED

The following references are of record in the file of this patent:

UNITED STATES PATENTS

| Number | Name | Date |
| --- | --- | --- |
| 1,741,709 | Orr | Dec. 31, 1929 |
| 2,114,096 | Noel | Apr. 12, 1938 |
| 2,134,115 | Flammang | Oct. 25, 1938 |
| 2,193,712 | Campbell | Mar. 12, 1940 |
| 2,232,671 | Loder | Feb. 18, 1941 |
| 2,255,288 | Jones et al. | Sept. 9, 1941 |
| 2,354,962 | Oehler et al. | Aug. 1, 1944 |
| 2,429,492 | Scranton | Oct. 21, 1947 |